Patented Apr. 11, 1939

2,153,627

UNITED STATES PATENT OFFICE 2,153,627

NEW MONOAZO DYESTUFFS

Arthur Howard Knight, Blackley, Manchester, England, assignor to Imperial Chemical Industries Limited, a corporation of Great Britain No Drawing. Application November 29, 1937, Serial No. 177,158. In Great Britain November 30, 1936

9 Claims. (Cl. 260—198)

The present invention relates to the manufacture of new monoazo dyestuffs and to their use in coloring acetate artificial silk.

In British Specification No. 237,739 there are described certain water-soluble monoazo dyestuffs obtained by the use of sulphatoethyl-naphthylamine (i. e., 1-N-hydroxyethyl-amino-naphthalene sulfuric ester) as coupling component. The dyestuffs of the present invention are superior to these known dyestuffs in the light fastness of the shades they produce on acetate artificial silk.

According to the present invention I manufacture new monoazo dyestuffs by coupling, in acid medium, a diazotized para-nitroamine of the benzene series of the general formula:

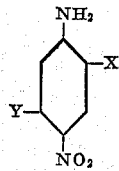

where X=hydroxyl and Y hydrogen or X=halogen and Y hydrogen or halogen, with an alkylsulfuric ester of 1-N-substituted-amino-5-naphthol of the general formula:

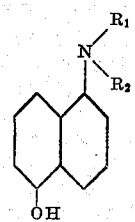

where $R_1$ is hydrogen or alkyl, containing not more than four carbon atoms and $R_2$ is hydroxyethyl or hydroxypropyl, where the ethyl or propyl group may be further substituted, for example, by chlorine or bromine.

Halogen, hydroxyl, and alkoxy derivatives of para-nitro-aniline may be substituted for the preferred embodiments hereinabove defined. Examples of such substituents are 2:4-dinitro-aniline; 2:6-dichloro (or bromo)-4-nitro-aniline, 5-nitro-2-amino-anisole, 4-nitro-2:5-dimethoxy (or ethoxy) aniline and 2:4-dinitro-6-chloro (or bromo)-aniline.

Alternatively I make the said new monoazo dyestuffs by treating the monoazo compounds obtained by coupling diazotized para-nitroamine of the benzene series as above defined in an acid medium with a 1-N-hydroxy-alkyl-amino-5-naphthol of the genaral formula:

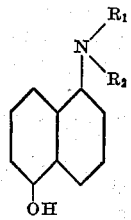

(where $R_1$ and $R_2$ have the significance given above), with an agent adapted to give the N-hydroxyalkyl sulfuric ester, e. g., sulfuric acid.

Also according to the invention I apply the new dyestuffs to the coloring of acetate artificial silk.

The new dyestuffs in the form of their alkali salts are soluble in water. The new dyestuffs have good affinity for acetate artificial silk which material they dye from an acid, neutral or alkaline dyebath in blue shades of good fastness properties. The new dyestuffs are also eminently suitable for the direct printing of acetate artificial silk.

The invention is illustrated but not limited by the following examples in which the parts are by weight:

Example I 17.25 parts of 2-chloro-4-nitroaniline are diazotized in the known way. To the aqueous solution of the diazo compound so obtained, a neutral solution of 30.5 parts of the sodium salt of the alkyl sulfuric ester of 1-N-beta-hydroxyethylamino-5-naphthol in 400 parts of water, is added slowly with good stirring. Coupling is rapid and, when complete, 10% salt is added (weight for volume) and the mixture made alkaline by the addition of sodium carbonate. The dyestuff is then filtered off and dried.

The new dyestuff dyes acetate artificial silk in blue shades of good fastness properties when applied from a neutral dyebath containing 1% common salt.

If 21.7 parts of 2-bromo-4-nitroaniline are used instead of 17.25 parts of 2-chloro-4-nitroaniline, a dyestuff is obtained which dyes acetate artificial silk in similar shades of similar fastness properties.

Example II 15 parts of 5-nitro-2-aminophenol are diazotized with 6.9 parts of sodium nitrite in the known way, the resulting diazo compound coupled with 30.5 parts of the sodium salt of the alkyl sulfuric ester of 1-N-beta-hydroxyethylamino- 5-naphthol, and the new dyestuff separated and dried as in Example I. The new dyestuff dyes acetate artificial silk in blue shades of good fastness properties.

Example III 20.7 parts of 2:5-dichloro-4-nitroaniline are diazotized in the known way by means of nitrosyl sulfuric acid in sulfuric acid solution. The sulfuric acid solution of the resulting diazo compound is poured onto ice and the solution then obtained added to a neutral solution of 30.5 parts of the sodium salt of the alkyl sulfuric ester of 1-N-beta-hydroxyethylamino-5-naphthol in 400 parts of water. The new dyestuff which precipitates is filtered off and re-suspended in water. The suspension is made alkaline with sodium carbonate, 10% salt added (weight for volume) and the dyestuff filtered off and dried.

It dyes acetate artificial silk in somewhat greener shades of blue than the first dyestuff of Example I.

If 29.6 parts of 2:5-dibromo-4-nitroaniline are used instead of 20.7 parts of 2:5-dichloro-4-nitroaniline, a dyestuff having similar properties is obtained.

Example IV 17.25 parts of 2-chloro-4-nitroaniline are diazotized in the known way and the aqueous diazo solution added to a neutral aqueous solution of 31.9 parts of the sodium salt of the alkyl sulfuric ester of 1-N-gamma-hydroxypropylamino-5-naphthol in 400 parts of water. The new dyestuff is separated and dried as in Example I. It dyes acetate artificial silk in somewhat greener shades of blue than the first dyestuff of Example I.

If 34.5 parts of the sodium salt of the alkyl sulfuric ester of 1-N-gamma-chloro-beta-hydroxypropylamino-5-naphthol are used instead of 31.9 parts of the sodium salt of the alkyl sulfuric ester of 1-N-gamma-hydroxypropylamino-5-naphthol a dyestuff having very similar properties is obtained.

Example V

The diazo compound from 17.25 parts of 2-chloro-4-nitroaniline is coupled with 20.3 parts of 1-N-beta-hydroxyethylamino-5-naphthol in acid medium. The insoluble compound so obtained is separated, dried and then slowly added in powder form with stirring to 250 parts of 80% sulfuric acid. Stirring is continued until the following solubility test is satisfied. Take a small sample, add it to ice and filter the resulting suspension. Stir the solid with water, make just alkaline with sodium carbonate and heat. A clear solution should be produced. The sulfuric acid solution is then poured onto ice. The new dyestuff which separates is filtered off and re-suspended in cold water. The suspension is treated with 10% salt (weight for volume), made alkaline with sodium carbonate and the dyestuff filtered off and dried.

It dyes acetate artificial silk in a similar manner to the first dyestuff of Example I.

If 25.9 parts of 1-N-beta-hydroxyethyl-N-n-butylamino-5-naphthol are used instead of 20.3 parts of 1-N-beta-hydroxyethylamino-5-naphthol, a dyestuff is obtained which dyes acetate artificial silk in greener shades of blue than the above dyestuff. 1-N-beta-hydroxyethyl-N-n-butylamino-5-naphthol is obtained by reacting 1-N-beta-hydroxyethylamino-5-naphthol with excess of n-butyl bromide in aqueous alcohol at an elevated temperature in the presence of an acid binding agent, e. g., chalk.

Example VI 21.7 parts of 2-bromo-4-nitroaniline are used instead of 17.25 parts of 2-chloro-4-nitroaniline in the first part of Example V. In this way a new water-soluble dyestuff is obtained which dyes acetate artificial silk in similar shades to those from the first dyestuff of Example V.

As many apparently widely different embodiments of this invention may be made without departing from the spirit and scope thereof, it is understood that I do not limit myself to the specific embodiments thereof except as defined in the appended claims.

I claim:

1. A dyestuff represented by the formula:

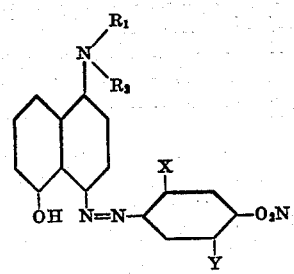

in which X means one of a group consisting of hydroxyl and halogen, Y means one of a group consisting of hydrogen and halogen, $R_1$ means one of a group consisting of hydrogen and alkyl having less than five carbon atoms, and $R_2$ means one of a group consisting of sulfatoethyl and sulfatopropyl.

2. The compounds described in claim 1 in which X means hydroxyl and Y means hydrogen.

3. The compounds described in claim 1 in which X means halogen and Y means one of the group consisting of hydrogen and halogen.

4. The compounds represented by the formula:

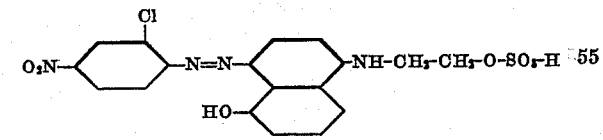

5. The compounds represented by the formula:

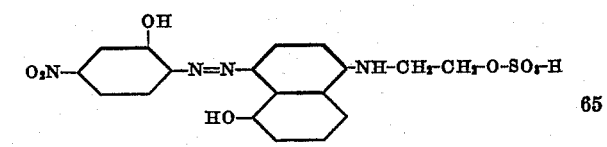

6. The compounds represented by the formula:

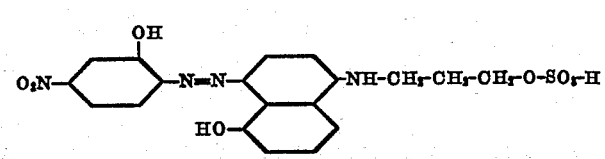

7. The process of preparing compounds useful in dyeing cellulose acetate which comprises coupling in acid medium a diazotized nitroamine of the formula:

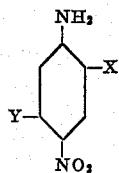

in which X stands for one of a group consisting of hydroxyl and halogen and Y stands for one of a group consisting of hydrogen and halogen, with an N-substituted 1:5-amino-naphthol of the formula:

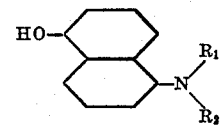

in which $R_1$ means one of a group consisting of hydrogen and alkyl having less than five carbon atoms and $R_2$ means one of a group consisting of sulfatoethyl and sulfatopropyl.

8. The process of claim 7 in which X means hydroxyl and Y means hydrogen.

9. The process of claim 7 in which X means halogen and Y means one of a group consisting of hydrogen and halogen.

ARTHUR HOWARD KNIGHT.